July 10, 1956  F. BERTRAM  2,753,890
DEVICE FOR DISCHARGING A PREDETERMINED QUANTITY OF A LIQUID
UNDER PRESSURE, IN PARTICULAR WATER FOR FLUSHING CLOSETS
Filed Aug. 14, 1951  6 Sheets-Sheet 1

INVENTOR.
Felix Bertram
BY

INVENTOR.
Felix Bertram

INVENTOR.
Felix Bertram
BY

INVENTOR.
Felix Bertram

United States Patent Office 2,753,890
Patented July 10, 1956

2,753,890

DEVICE FOR DISCHARGING A PREDETERMINED QUANTITY OF A LIQUID UNDER PRESSURE, IN PARTICULAR WATER FOR FLUSHING CLOSETS

Felix Bertram, Lorrach, Germany, assignor to Pag Patentgesellschaft A. G., Zurich, Switzerland Application August 14, 1951, Serial No. 241,781

Claims priority, application Germany August 14, 1950

6 Claims. (Cl. 137—630.19)

The present invention relates to a device for discharging a predetermined quantity of liquid under pressure and in particular to a device capable of being connected to the domestic water supply for the purpose of flushing water-closets.

Devices for this purpose are known per se, but they all have greater or lesser disadvantages. Above all, such a device, if it is to correspond to modern technical requirements, must be simple to operate, i. e. the entire operation must, if possible, be performed automatically in the manner desired by actuation of a single, easily operable handle. It is furthermore desirable that the quantity of liquid to be discharged be just as easily adjustable, either stepwise or possibly continuously. It is also necessary that during its entire period of idleness no delicate parts of such a device be constantly surrounded by the liquid it controls because damage may be occasioned which may substantially reduce the life during which the device operates without trouble or defect. Such damage may be of a physical or chemical nature, such as that caused by calcareous deposits in the case of water or corrosion by the action of acids and lyes and the like in the case of other liquids. Moreover, the operation of the device should be as silent as possible. A certain freedom from return shocks is even an official prerequisite for the admission of such a device for connection to the domestic water supply system. Devices answering all these conditions have so far been unknown. The provision of such a device is the purpose of the present invention.

A great variety of apparatus are known and used for the particular application of flushing water closets, viz., the conventional flushing cisterns and the pressure-operated valve passages, of which different constructions are commercially available, and the vertical flow cocks. Flushing cisterns require a comparatively large space. They are unattractive and after use take some time to refill and return to operative condition. Refilling is, in addition, accompanied by the well-known unpleasant gushing noise. Water consumption cannot be controlled with conventional flushing cisterns because the entire quantity of water, which is available for maximum requirements, is used in every flushing operation, while a considerably smaller quantity of water is required for perfect flushing in the majority of cases, e. g. after urination. This results in a waste of water which, particularly in large cities, runs into very large quantities.

The usual pressure valves are not only very liable to become defective owing to their delicate construction, and very dependent on the available water pressure, but also comparatively noisy. At the same time they are much impaired by water deposits because the delicate parts of such valves are situated in a chamber continually submerged in water. Particularly in the case of water with high calcareous content frequent defects and return-shocks must be reckoned with.

Vertical flow cocks are not in accordance with the laws of hygiene because a sufficiently large water passage in accordance with regulations is not ensured. On the other hand, such cocks are also apt to cause excessive water consumption if they are not closed in time. Abrupt closure of the cock, moreover, occasions strong and even very audible return shocks which often cause conduits to burst.

The new device according to the present invention was developed with a view to obviating said deficiencies and to achieving the above advantages, and is characterized by a valve assembly which can be easily operated to open a passage for the flow of a liquid directly against the pressure of said liquid, this being effected by increasing, step-wise or continuously, the operative area or the cross section of said passage, starting from a minimum value, said effect being obtained for instance by subdivision into a plurality of valves.

It is known practice to provide valves in flushing cisterns installations with rods of different lengths in order that they may be operated consecutively. But these valves operable for discharge in the direction of the liquid pressure in the conduit, which cannot be closed against such pressure before equal pressure obtains on opposite sides of the valves. In the known arrangement, the principle of operation is thus fundamentaly different. Apart from that, the delicate parts of this known arrangement are also constantly immersed in water, so that calcification may set in.

The arrangement according to the invention enables valves with any size of discharge area to be easily adjusted against direct liquid pressure, which fact constitutes a considerable advantage for the purpose outlined in respect of both construction and function. The valve parts rendered successively effective do not suddenly open the entire discharge area, nor suddenly close it, and thus return shocks are largely obviated. The parts of the device constantly immersed in the liquid, such as water, are all insensitive to the action of such liquid. The delicate operative mechanism is not in contact with the liquid except during the short periods of actual use, and thus the likelihood of defects is reduced to a minimum. The fact that the installation is rendered effective independently of the liquid to be controlled for automatic retardation of the closing movement of the valve assembly, and that the said installation is also placed outside the flow path of said liquid, constitutes another advantage of the new device.

Another very remarkable advantage of the new device lies in that it may, by virtue of its particular design, it will be operated stepwise in order to release and discharge adjustable quantities of flushing water. The arrangement of the new device may even be such as to activate the entire function by turning a simple hand lever, so that it takes place automatically, while an adjusting scale with which the device may be combined indicates the quantity of flushing water desired. Accordingly, the new device is the first to solve satisfactorily the problem of duplex flushing, i. e., an easily adjustable multiple flushing operation. The principle of construction of the new device is more or less novel, and will be described in greater detail with reference to the embodiment illustrated in the attached drawings, in which:

The illustrated device, which is a flushing apparatus for water closets, consists of two main parts, viz. the water casing 1 and the casing 2 housing an oil brake. The said two casings are integrated into a unitary structure by the wall 3 (see Fig. 7). The casing 2 housing the oil brake is mounted in front of the water discharge casing 1. The two parts 1 and 2 are further enclosed by a common jacket 4 constituting a unitary enclosure for the entire device. This jacket is held by the screws 5 engaging in studs 6 arranged on the casing 1. The threaded inlet 7 is connected to the water supply conduit. The discharge of the water is effected through outlet pipe 8 attached by a cap nut 9, enclosing a rubber packing 10.

The valve guide member 11 is arranged in the water casing 1. It is clamped by means of the threaded ring 14 into sealing contact with packing 15 by the sleeve 12 comprising an inlet opening and supporting a spring seating plate 13. On their outer periphery, the parts 11, 12 and 13 each carry a projection 11', 12' and 13' securing said parts against rotation in the groove 1' on the left side of the water casing 1. Cap 16 and its gasket 17 lightly seal the upper end of the water casing 1. In the upper portion of the valve guide member three or four valve guide bores 11' are provided which house sliding valve bodies 18 of different lengths and diameter.

Figure 7:
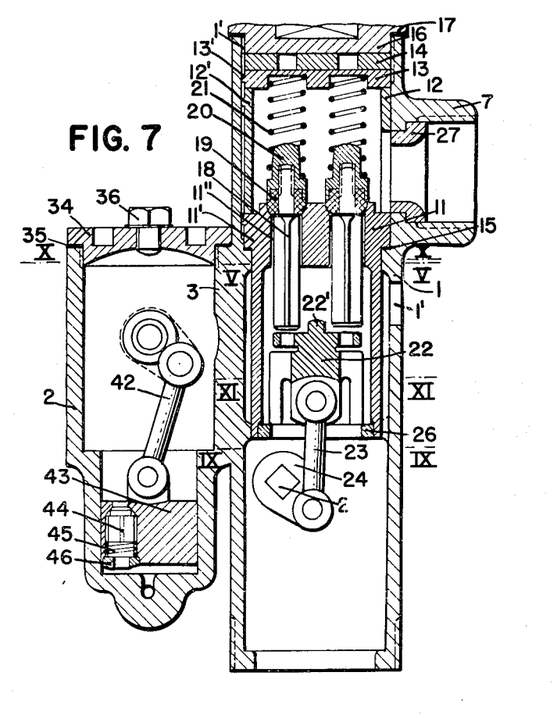
Fig. 7 is a vertical section of the device through the axis of the water and oil-brake casings as on line VII—VII in Fig. 4.
Figure 11:
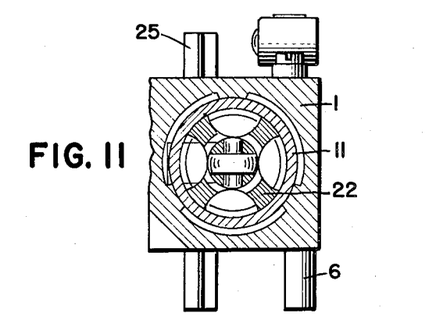
Fig. 11 is a section on line XI—XI in Fig. 7 through the valve lifter.

On the heads of every valve body 18 is mounted a rubber gasket 19 clamped firmly into position by the screwed-on valve head nut 20. Said valve head nut at the same time constitutes a guide for the compression springs 21 whose upper ends are guided in the spring seating plate 13. The said springs force the valves into their seats and thus achieve perfect seal in conjunction with the water pressure. In the lower bore of valve guide member 11 is arranged the valve lifter 22 connected with the shaft 25 for the hand lever 54 of the device by connecting rod 23 and crank 24. The valve lifter 22 in non-operative position rests upon a supporting ring 26 screwed into the lower portion of the valve guide member 11. This supporting ring and the stud 22', which is arranged on the valve lifter 22 and adapted to abut on top, limit the stroke of the valve lifter. Valve lifter 22 is adapted to allow the water supplied from above unobstructed passage through its recesses and bores (Figs. 7 and 11).

Figure 6:
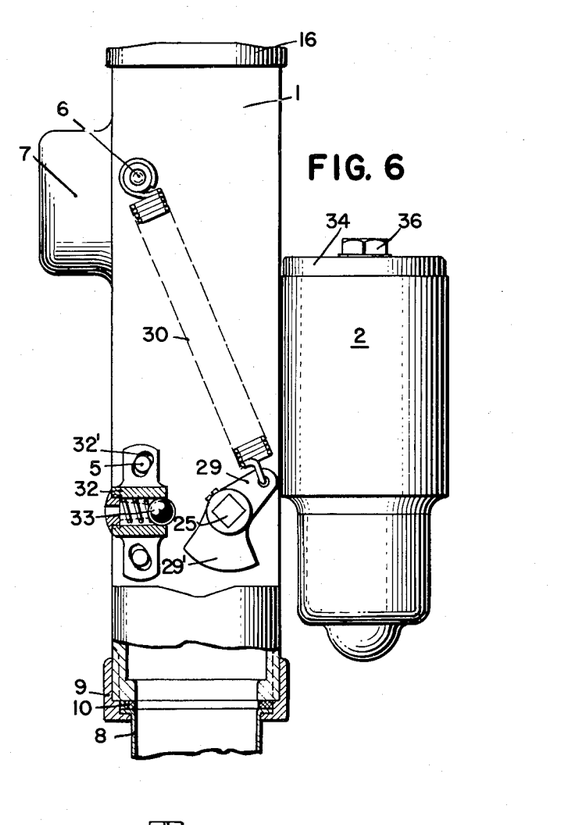
Fig. 6 is a left-hand end view of the device showing the return spring.
Figure 8:
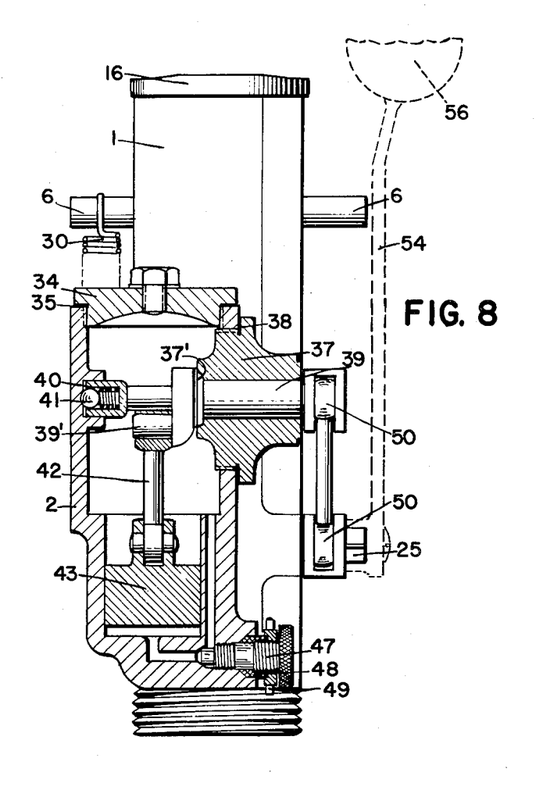
Fig. 8 is a front view of the device with the casing jacket removed and the oil-brake casing cut open on line VIII—VIII in Fig. 3.
Figure 9:
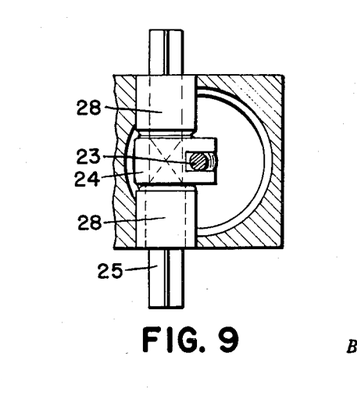
Fig. 9 is a sectional part view on line IX—IX in Fig. 7 through the discharge tube of the water casing showing the crank shaft operating the valve rod as seen from the top.
Figure 10:
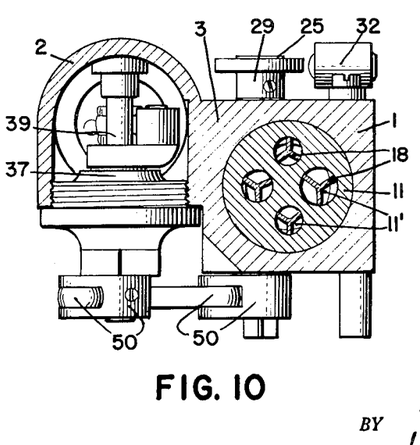
Fig. 10 is a horizontal sectional view of the device on line X—X in Fig. 7 with the view into the oil-brake casing and through the valve guide member with its valves in the water casing, the assembly consisting of four individual valves.

In the upper part of the threaded inlet 7 is arranged an interchangeable diiaphragm 27 the different openings of which serve as a coarse flow regulator. The outer wall of casing 1' carries a breaker opening 1" below the inlet pipe 7, which performs the well-known function of preventing a siphoning action through the connection with the hollow space between the wall of the casing 1 and the valve guide member 11 (Figs. 7 and 11). The right-hand end of the crank shaft 25 supported in two bushes 28 formed of self-lubricating bronze (Fig. 9) fixedly carries the hand lever 54. On the left end of the end-to-end crank shaft 25 is mounted the spring tensioner 29 (Fig. 6). The tension spring 30 is attached to its upper arm and held by the suspension stud 6 at its other end. This stud also serves for the securing of jacket 4. The lower part of the spring tensioner 29, which is made of hardened steel, is shaped as a segment 29'. In the same plane as this segment 29', and spaced in accordance with the circular movement thereof, is a stop 32 containing a spring-controlled ball 33. The stop 32 is vertically adjustable on a curved path through the elongated openings 32' for the clamping screws 5 and 5'. The front part of casing 2 is completely filled with thermally stable oil and firmly closed by the upper screw-on cap 34 and packing 35. In the cap 34 is arranged an oil-filling screw 36 with gasket. On the right of this oil casing 2 as seen in Fig. 8 a journal bearing 37 made of self-lubricating bronze with a seal 38 is rigidly affixed by screwing. The bore of the journal bearing 37 in which a crank shaft 39 revolves, is conically enlarged on the left as at 37'. The compression spring 40 and the ball 41 arranged at the left end of the crank shaft force the corresponding cone of crank-shaft 39 into the cone of journal bearing 37, thus providing a tight seal in the bore for the journal bearing 37 without appreciable friction. The stuffing box otherwise usual is thus eliminated. The connecting rod 42 carrying a brake piston 43 is mounted on the stud 39' of the crank shaft 39. This piston 43 houses a three-point guide type check valve 44 which is gently pressed upon the sealing valve seat by means of a small screw 46 and a small compression spring 45. In this manner the check valve becomes immediately operative whenever the piston stroke is completed. A set screw 47 with seal 48 and check nut 49 serving as a needle valve are arranged on the right in the lower portion of the oil chamber.

The function of the oil brake described is as follows: Rotation of the crank-shaft 39 lifts the brake piston 43 through connecting rod 42. As the space within the casing 2 is completely filled with oil, the check valve 44 is opened by the oil displacement of piston 43 and oil flows rapidly downwards through the valve passage in accordance with the stroke of the piston 43. At the end or completion of the piston stroke, the check valve 44 is immediately closed by the pressure of the small spring 45. The return movement of the oil now ensuing is controlled by the set screw 47 in such a manner that the circulation of oil takes place more quickly on account of the passage provided being larger, the brake piston thus being withdrawn at greater speed, while the withdrawal of the piston takes place more slowly when the passage is reduced. Its speed may thus be adjusted at will. The arrangement of the oil brake is effected vertically and the set screw 47 acting as a needle valve is mounted at the lowermost point. In this manner, any oil loss caused by prolonged use and the entrance of air into the oil chamber is rendered ineffective in respect of the function of the oil brake because the air will remain on top and cannot impair the operation of the valves.

As appears from Figs. 3, 4, 8 and 10, the crank shaft 39 of the oil brake described is connected to the lever shaft 25 through the connecting rod 50 so that their operation is coupled. If now the device according to this invention is connected to the water supply conduit by means of the thread in the inlet pipe 7 and the connection to the water closet attached to the outlet pipe 8, and the device then subjected to supply pressure, said device is ready for operation. Its function is then as follows:

By depressing the hand lever 54 arranged on the lever shaft 25 by forward pull, the said shaft 25 performs a left-hand turn (as seen from the right) and the crank 24 arranged thereon thus exerts an upward pressure on the valve lifter 22 via the connecting rod 23. This causes the first valve body 18, which is the longest, to be lifted from its seat, and the water under conduit pressure can then flow in its place, this valve at the same time being relieved from water pressure. After relieving this first valve, the valve lifter 22 has reached the next longest valve body 18 and lifts it from its seat. Water can now pass here and relieve this valve from pressure. The same operation is performed with the third and/or fourth valve body. This step-wise opening of the three or four valve bodies 18 causes the water pressure effective upon the total cross sectional area of the valves, which could not otherwise be overcome, to be divided and easily overcome so that the valves can be opened directly against the water pressure. In this manner only a small portion of the new device is placed under water pressure. This portion comprises no movable parts subject to disorder except the valve head nuts 20 and the compression springs 21 which are insensitive to calcareous deposits. The calcareous deposits in known installations cannot, therefore, occur with this construction. The cross-sectional area and shape of the valve elements, the area of which may increase in the order of their operation, ensure noiseless flow of water.

Together with the described operation caused by depressing lever 54, the above-mentioned lifting of the brake piston 43 is effected via the connecting rod 50. At the same time the compression springs 21 and the tension spring 30, connected to the lever shaft 25 through the spring tensioner 29, are tensioned. Thus, if the lever 54 is depressed so that the stud 22' of the valve lifter 22 abuts on valve guide member 11, the flushing operation of the device described is completed. Hand lever 54 is released, the tension spring 30 and the compression springs 21 causing the return movement in conjunction with the water pressure. At the same time the oil brake becomes operative, which, as previously described, is controlled by set screw 47. By means of said set screw 47, the velocity of the return movement of the brake piston 43 can be accurately timed. In this manner the consecutive closing of the valve bodies 18 is not completed until such quantity of water as is required for adequate flushing of the closet has been discharged. According to the water pressure present, this discharge is effected more or less rapidly. The quantity discharged is roughly controlled already by the diaphragm 27 arranged in the inlet 7. The closing operation of the valve bodies 18, which inverts the sequence of the opening of said valve bodies, achieves a noiseless and smooth completion of the operation entirely free from return shock thanks to the stepwise timed sequence. As shown by Fig. 7, the threaded supporting ring 26, which supports the valve lifter 22 when the device is idle, is screwed in in such a manner that a space is formed between the valve lifter and valve foot, which causes any wear and tear of the valve rubber 19 to be rendered ineffective in respect of its sealing function.

The water flow per flushing operation is constant in the known devices, whether flushing cisterns or pressure installations of various constructions. This constant flow constitutes a waste of water whenever the closet is used for urination only. In order to obviate this drawback, the new device provided for a double flushing operation. Fig. 6 shows the spring tensioner 29 mounted on the lever shaft 25 as already described. The lower portion of said tensioner is formed as a segment. In the same plane with this segment, and in the determined spaced relation to its curved path, the stop 32 with the springed ball 33 is fixed to the outer wall of casing 1 by means of two screws 5 and 5'. Since the two bores for the said screws are curved elongated slots, the stop 32 is adjustable on a curved path. This arrangement enables a double flushing operation to be performed whenever necessary.

Figure 1:
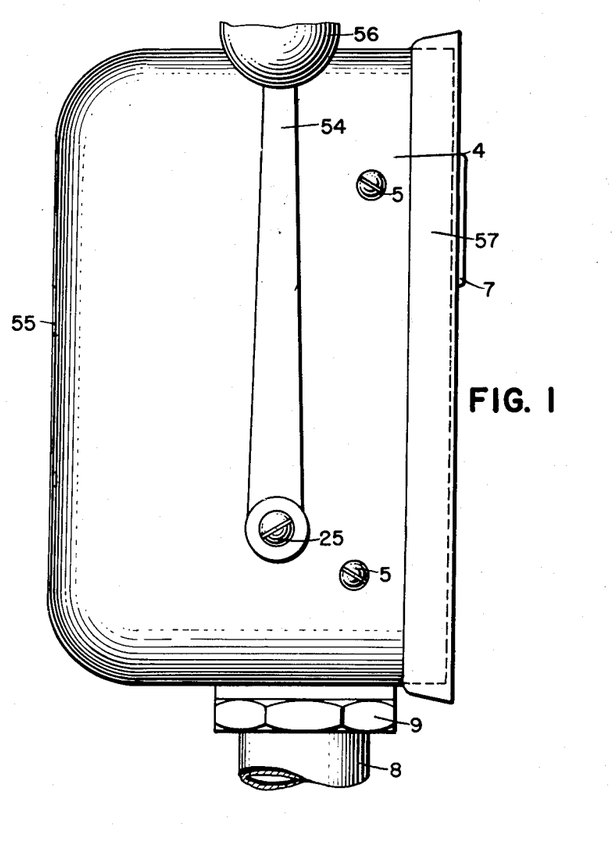
Fig. 1 is a general view of a water flushing device according to the invention as viewed from the right, showing the hand lever with mounted casing jacket.
Figure 2:
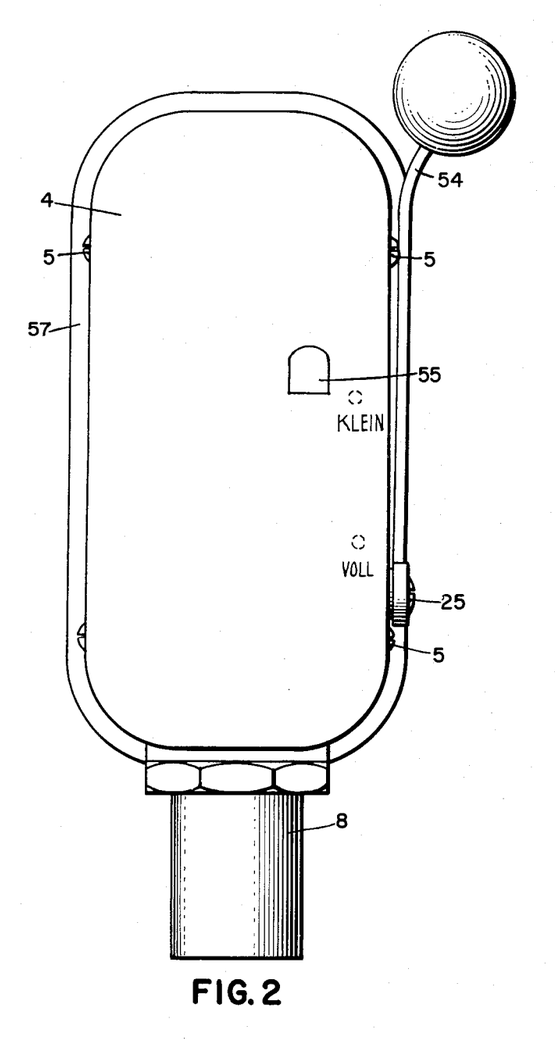
Fig. 2 is a general front view of the device complete with its casing jacket.
Figure 3:
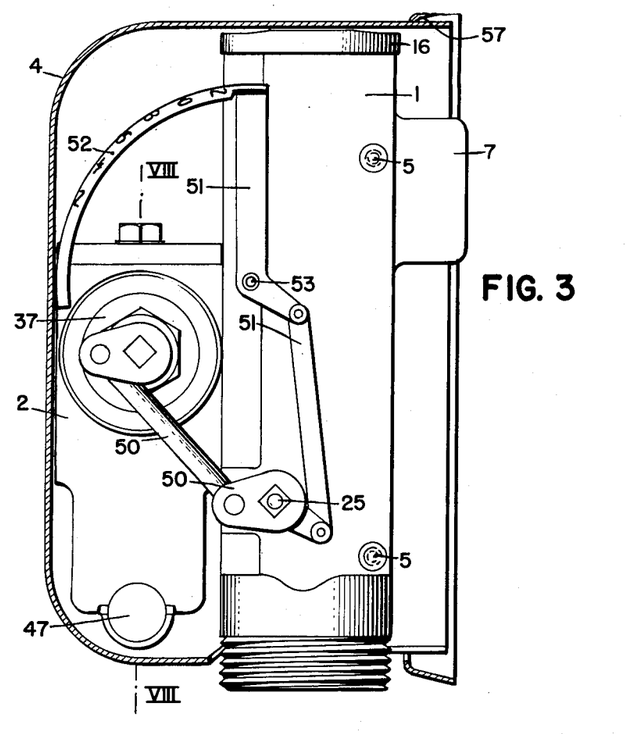
Fig. 3 is a right-hand end view of the device with the casing jacket cut open and with the hand lever and the discharge tube removed.
Figure 4:
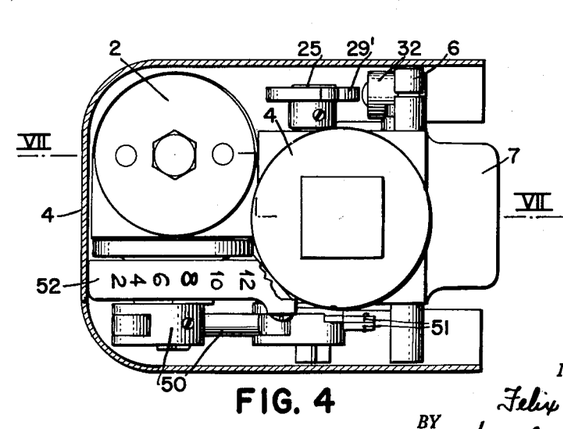
Fig. 4 is a plan view of the device with the casing jacket cut open, and with the hand lever and hand lever return spring removed.
Figure 5:
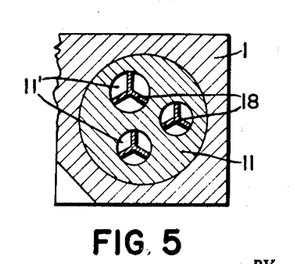
Fig. 5 is a sectional part view on line V—V in Fig. 7 showing the individual valve bodies and their guides when the valve assembly comprises e. g. only three such valves.

The operation is as follows: As previously described, the lever 54 is depressed to operate the device, and the segment 29' of the spring tensioner 29 is moved towards the springed ball 33 housed in the stop 32. When the lever has been moved over ⅗ of its travel, segment 29' engages ball 33 with a noticeable click. If the lever 54 is released at this moment, the valve is closed as previously described with the difference that only one-half of the quantity of water discharged with the lever fully depressed is released. Thus, a "small" flushing operation is performed. If the closet is used for defecation, the lever 54 is fully depressed by somewhat greater pressure after the segment 29' has engaged springed ball 33, and only then released. The springed ball 33 is pushed back by segment 29', which slides past the ball 32 inserted in the stop 32. The closing operation is the same as in the example previously described. When the segment has released the ball on its return movement, said ball returns into its original position, and a complete flushing operation has been performed. Upward or downward adjustment of the adjustable stop 32 regulates the "small" flushing operation so that more or less than one-half of the water released in a full flushing operation is permitted to be discharged. The relative position of the lever for these two flushing operations is marked by the words "small" and "full" on the casing jacket 4, and may thus be detected visually and by touch (Fig. 2). Another possibility of effecting a flushing operation according to requirement appears from Figs. 2, 3 and 4. A lever arrangement 51 is there connected with the lower end of the connecting rod 50 on the upper end of which a circular dial 52 is arranged. When the lever 54 is depressed, this dial turns past the gate 55 shown in Figs. 1 and 2 on its hub 53 and indicates the volume of water flow according to the lever position. In this manner the user of the closet is enabled to control the water consumption according to requirement. Both arrangements may be employed singly or in combination. When used in combination, control is not only visual and by touch owing to the stop but the volume of the water flow can also be read off on the dial. In this manner an enormous quantity of water can be saved.

A ball-shaped handle 56 is arranged on lever 54 for convenient manipulation.

When the device is connected, the water flow adjusted in accordance with the pipe pressure, and the casing jacket 4 mounted, the sleeve 57 sliding on the jacket 4 is pushed against the wall. The device is then completely mounted, and protected against dirt and tampering.

A device of the type described may also be employed for other purposes except flushing, wherever a rapid, regular and timed discharge of a liquid under pressure is necessary, e. g. for timed water discharge or similar filling operations in the chemical industry and the like.

What I claim is:

1. Flow control apparatus comprising, in combination, a casing having an inlet to admit a fluid to the interior of said casing and an outlet through which the fluid flows from said casing; a partition located in said casing between said inlet and outlet thereof and being formed with a plurality of bores through which fluid passes upon movement from said inlet to said outlet of said casing; a plurality of valve members respectively located over said bores of said partition on the inlet side thereof to close said bores for preventing the flow of fluid through said casing and being movable away from said bores to open the latter and permit fluid to flow through said casing; a plate located in said casing between said partition and outlet thereof for movement toward and away from said partition; crank means turnably mounted on said casing, having an operating handle located outside of said casing, and being operatively connected to said plate for moving the same toward and away from said partition; a plurality of motion transmitting members, respectively fixed to said valve members, extending through said bores, and being located opposite said plate for transmitting a movement from the latter to said valve members, said motion transmitting members being formed with passages providing flow paths for fluid passing through said bores and along said motion transmitting members, said motion transmitting members being of different lengths so that said valve members are successively opened to produce a gradual increase in the volume of fluid flow through said casing upon operation of said crank means to move said plate toward said partition; dash pot means located on the outside of said casing; and actuating means connected to said dash pot means for actuating the same and being connected to a part of said crank means located on the outside of said casing so that said actuating means and crank means are simultaneously operated upon movement of said operating handle.

2. Flow control apparatus comprising, in combination, a casing having an inlet to admit a fluid to the interior of said casing and an outlet through which the fluid flows from said casing; a partition located in said casing between said inlet and outlet thereof and being formed with a plurality of bores through which fluid passes upon movement from said inlet to said outlet of said casing; a plurality of valve members respectively located over said bores of said partition on the inlet side thereof to close said bores for preventing the flow of fluid through said casing and being movable away from said bores to open the latter and permit fluid to flow through said casing; a plate located in said casing between said partition and outlet thereof for movement toward and away from said partition; crank means turnably mounted on said casing, having an operating handle located outside of said casing, and being operatively connected to said plate for moving the same toward and away from said partition; a plurality of motion transmitting members, respectively fixed to said valve members, extending through said bores, and being located opposite said plate for transmitting a movement from the latter to said valve members, said motion transmitting members being formed with passages providing flow paths for fluid passing through said bores and along said motion transmitting members, said motion transmitting members being of different lengths so that said valve members are successively opened to produce a gradual increase in the volume of fluid flow through said casing upon operation of said crank means to move said plate toward said partion; dash pot means located on the outside of said casing and having a bottom cylinder in which a piston is slidable so that the entry of air through the top of the dash pot means to the oil or other fluid therein will not effect the operation of the dash pot; and actuating means connected to said dash pot means for actuating the same and being connected to a part of said crank means located on the outside of said casing so that said actuating means and crank means are simultaneously operated upon movement of said operating handle.

3. Flow control apparatus comprising, in combination, a casing having an inlet to admit a fluid to the interior of said casing and an outlet through which the fluid flows from said casing; a partition located in said casing between said inlet and outlet thereof and being formed with a plurality of bores through which fluid passes upon movement from said inlet to said outlet of said casing; a plurality of valve members respectively located over said bores of said partition on the inlet side thereof to close said bores for preventing the flow of fluid through said casing and being movable away from said bores to open the latter and permit fluid to flow through said casing; a plate located in said casing between said partition and outlet thereof for movement toward and away from said partition; crank means turnably mounted on said casing, having an operating handle located outside of said casing, and being operatively connected to said plate for moving the same toward and away from said partition; a plurality of motion transmitting members, respectively fixed to said valve members, extending through said bores, and being located opposite said plate for transmitting a movement from the latter to said valve members, said motion transmitting members being formed with passages providing flow paths for fluid passing through said bores and along said motion transmitting members, said motion transmitting members being of different lengths so that said valve members are successively opened to produce a gradual increase in the volume of fluid flow through said casing upon operation of said crank means to move said plate toward said partition; dash pot means located on the outside of said casing; actuating means connected to said dash pot means for actuating the same and being connected to a part of said crank means located on the outside of said casing so that said actuating means and crank means are simultaneously operated upon movement of said operating handle; and spring means operatively connected to said crank means for urging the latter and said actuating means therewith to a position of rest.

4. Flow control apparatus comprising, in combination, a casing having an inlet to admit a fluid to the interior of said casing and an outlet through which the fluid flows from said casing; a partition located in said casing between said inlet and outlet thereof and being formed with a plurality of bores through which fluid passes upon movement from said inlet to said outlet of said casing; a plurality of valve members respectively located over said bores of said partition on the inlet side thereof to close said bores for preventing the flow of fluid through said casing and being movable away from said bores to open the latter and permit a fluid to flow through said casing; a plate located in said casing between said partition and outlet thereof for movement toward and away from said partition; crank means turnably mounted on said casing, having an operating handle located outside of said casing, and being operatively connected to said plate for moving the same toward and away from said partition; a plurality of motion transmitting members, respectively fixed to said valve members, extending through said bores, and being located opposite said plate for transmitting a movement from the latter to said valve members, said motion transmitting members being formed with passages providing flow paths for fluid passing through said bores and along said motion transmitting members, said motion transmitting members being of different lengths so that said valve members are successively opened to produce a gradual increase in the volume of fluid flow through said casing upon operation of said crank means to move said plate toward said partition; and click means operatively connected to said crank means for making an audible click when said crank means moves said plate through a fraction of its stroke toward said partition.

5. Flow control apparatus comprising, in combination, a casing having an inlet to admit a fluid to the interior of said casing and an outlet through which the fluid flows from said casing; a partition located in said casing between said inlet and outlet thereof and being formed with a plurality of bores through which fluid passes upon movement from said inlet to said outlet of said casing; a plurality of valve members respectively located over said bores of said partition on the inlet side thereof to close said bores for preventing the flow of fluid through said casing and being movable away from said bores to open the latter and permit fluid to flow through said casing; a plate located in said casing between said partition and outlet thereof for movement toward and away from said partition; crank means turnably mounted on said casing, having an operating handle located outside of said casing, and being operatively connected to said plate for moving the same toward and away from said partition; a plurality of motion transmitting members, respectively fixed to said valve members, extending through said bores, and being located opposite said plate for transmitting a movement from the latter to said valve members, said motion transmitting members being formed with passages providing flow paths for fluid passing through said bores and along said motion transmitting members, said motion transmitting members being of different lengths so that said valve members are successively opened to produce a gradual increase in the volume of fluid flow through said casing upon operation of said crank means to move said plate toward said partition; a cover located on said casing and being formed with a window; and a scale located on the outside of said casing opposite said window on the inside of said cover and being connected to said crank means for movement therewith so as to indicate through said window the extent to which said valve members are opened.

6. A dash pot comprising, in combination, a casing having a cylinder formed in a bottom end portion thereof; a piston slidable in said cylinder; crank means located in said casing over said piston and being operatively connected thereto for moving the same; bearing means forming part of said casing, being located at one side thereof, and turnably supporting said crank means for rotation about a predetermined axis, said bearing means having inside said casing an annular surface extending about said crank means; an annular projecting portion fixed to said crank means, extending about said axis, and being located next to and aligned with said annular surface of said bearing means; and spring means located in said casing at a side opposite said one side thereof and engaging said crank means to urge the annular projecting portion into engagement with said annular surface of said bearing means for sealing the interior of said casing.

References Cited in the file of this patent

UNITED STATES PATENTS

| Re. 19,252 | Marcus | July 24, 1934 |
| 292,536 | Cohn | Jan. 29, 1884 |
| 558,839 | Prusmann | Apr. 21, 1896 |
| 966,509 | Wulf | Aug. 9, 1910 |
| 1,498,226 | Beck | June 17, 1924 |
| 1,558,064 | Thrift | Oct. 20, 1925 |
| 1,831,138 | Rice | Nov. 10, 1931 |
| 1,970,039 | Fraser | Aug. 14, 1934 |
| 2,262,703 | Stuckenholt | Nov. 11, 1941 |
| 2,381,553 | Mott | Aug. 7, 1945 |